United States Patent [19]

Crigler et al.

[11] Patent Number: 5,683,638
[45] Date of Patent: Nov. 4, 1997

[54] SEAMLESS FLUSH MOUNTED COUNTERTOP SINK

[75] Inventors: Arthur J. Crigler, La Mirada; Hai Lecong, Reseda, both of Calif.

[73] Assignee: Excelstone International, Inc., Santa Fe Springs, Calif.

[21] Appl. No.: 672,765

[22] Filed: Jun. 20, 1996

[51] Int. Cl.⁶ .................................................. B28B 1/08
[52] U.S. Cl. ........................ 264/71; 264/162; 264/250; 264/278
[58] Field of Search ..................... 264/71, 162, 250, 264/278

[56] References Cited

U.S. PATENT DOCUMENTS

| | | |
|---|---|---|
| D. 354,119 | 1/1995 | Hauser, II . |
| D. 355,023 | 1/1995 | Kolada . |
| D. 355,949 | 2/1995 | Laughton . |
| D. 356,859 | 3/1995 | Formgren . |
| D. 358,457 | 5/1995 | Dannenberg . |
| 3,433,860 | 3/1969 | Ruggles et al. .......... 264/71 |
| 3,608,038 | 9/1971 | Smith ...................... 264/162 |
| 4,343,752 | 8/1982 | Cann ....................... 264/71 |
| 5,274,963 | 1/1994 | Tsur . |
| 5,601,679 | 2/1997 | Mulcahy ................. 264/250 |

*Primary Examiner*—James Derringtron
*Attorney, Agent, or Firm*—Gordon K. Anderson

[57] ABSTRACT

A process for fabricating a seamless flush mounted countertop sink, which includes the steps of constructing a sink bowl (22) that has an outwardly extending peripheral top flange (26). The sink bowl is then captivated upside-down on a flat mold (34) and uncured filled polymer (40) is poured on the mold and flattened to a level above the flange, creating an integral countertop sink (44). The polymer is vibrated and cured. In the preferred embodiment, the top surface of the countertop is sanded smooth and, in the second embodiment, a clear gelcoat is added prior to pouring, creating a glossy finish. The third embodiment spaces the sink bowl flange within the thickness of the countertop (42) and is finished by either sanding, or a previous gelcoat is added, as above.

22 Claims, 5 Drawing Sheets

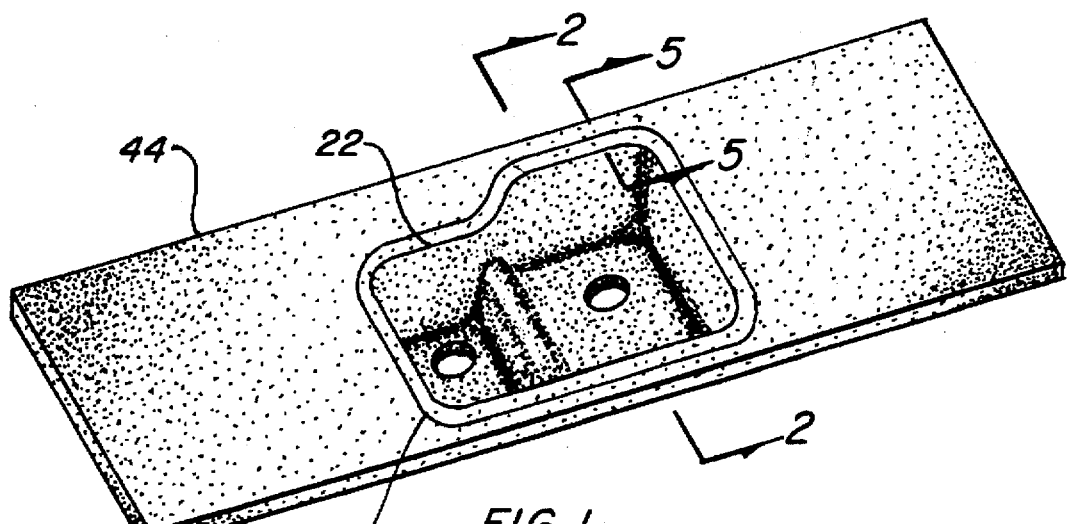
FIG. 1
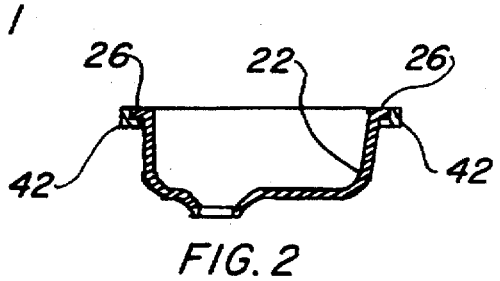
FIG. 2
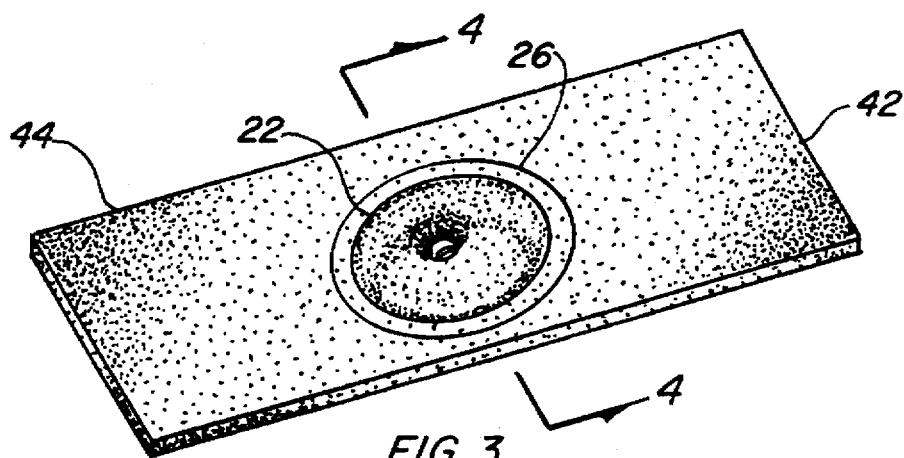
FIG. 3
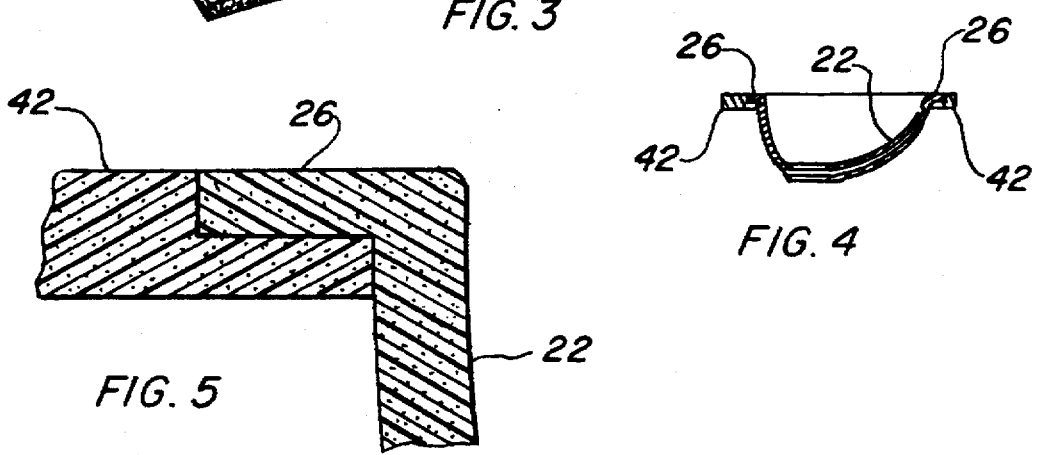
FIG. 4
FIG. 5

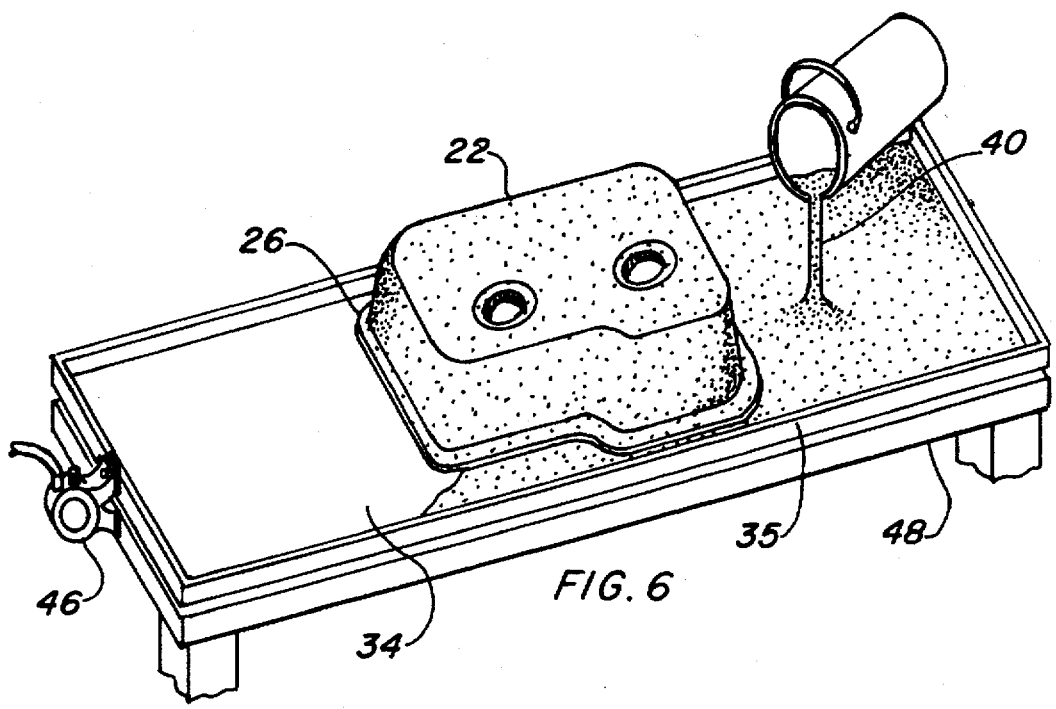
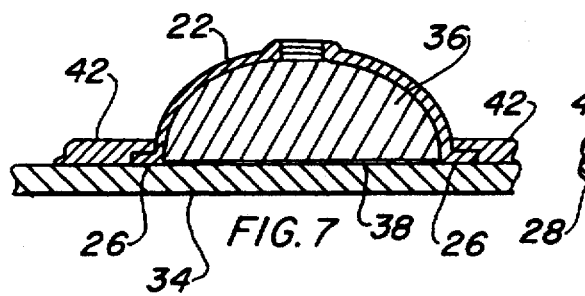
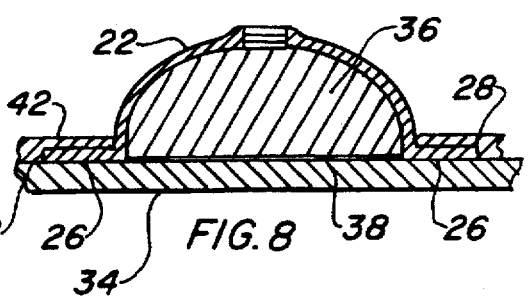
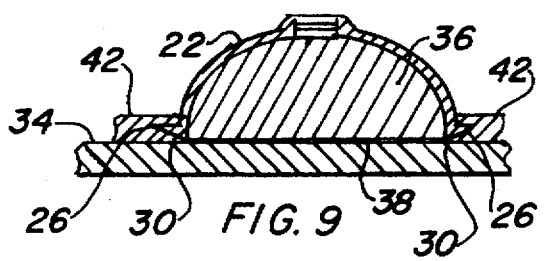
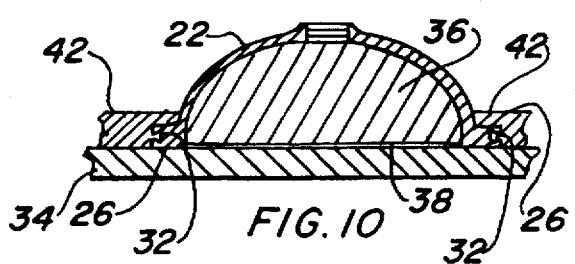
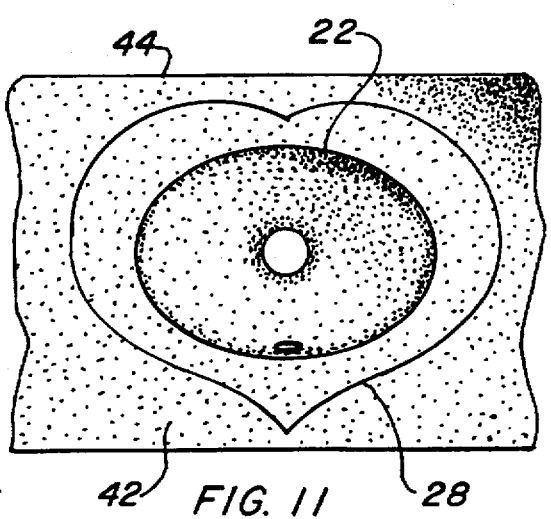

SEAMLESS FLUSH MOUNTED COUNTERTOP SINK

TECHNICAL FIELD

The present invention relates to countertop sinks in general. More specifically to a combined synthetic thermoset countertop and sink fabricated separately, having no seam therebetween.

BACKGROUND ART

Previously, when prior art fabricated a countertop sink made of a hard, dense, synthetic surface material resembling granite or marble, it necessarily required cutting a precision opening in the countertop and seating the sink bowl on exposed edges of the opening to complete assembly. This opening cut into the material must be tapered at the exact angle of the sink in order for the sink to fit flush with the top surface when it is installed. Special techniques have been required to form this beveled edge in the countertop and it will be noted that the material is cut in the same basic manner as natural stone, except when it is synthetic, it is not as hard to cut. U.S. Pat. No. 5,274,963, issued to Tsur, is directed to such a method for natural stone, which also covers the thermoset material technique. This procedure compensates for tool wear and teaches how to maintain uniformity of the beveled edge. This is accomplished by cutting in accordance with the contour of a template. The cutting means include a cutting head mounted on a drill or router tool with movement of the cutting head guided by the template. It is necessary, however, to have the template machined by computer numerical control (CNC) techniques in order to provide the exact contour of the beveled edge. If replacement of the cutting head is required during the procedure, a mechanical arrangement is provided for guiding the depth of the cutting head, thus a new or the unused portion of the head may be moved vertically into the cut. The mechanical guide also provides automatic adjustment to compensate for the new dimensional outline of the tool, thus preserving the overall contour of the beveled edge.

Prior art further applies adhesive to the joint between the sink and the countertop in order to finish the joint and make it watertight. This material also fills any slight irregularities or unevenness of the beveled hole that may require building up the seam to the point that the sink top is flush with the surface of the countertop.

For background purposes and as indicative of the art to which the invention is related, applicability may be directed to the references cited in Tsur's patent and the following design patents.

| Patent No. | Inventor | Issue Date |
|---|---|---|
| D355,023 | Kolada | Jan. 31, 1995 |
| D354,119 | Hauser II | Jan. 3, 1995 |
| D358,457 | Dannenberg | May 16, 1995 |
| D356,859 | Formgren | Mar. 28, 1995 |
| D355,949 | Laughton | Feb. 28, 1995 |

DISCLOSURE OF THE INVENTION

In the past, the problem of how to make a sink into a countertop has existed since the advent of synthetic filled plastic surface material in a solid form. Previously, synthetic countertop sinks were formed as one piece in a mold using thermoset plastics, however, when a dense material filled with hard granulated particles to simulate stone became popular, this approach was not practical and, therefore, the problem became acute. One type of countertop surface material to form a flush mount sink is provided by E. I. du Pont de Nemours under the tradename "CORIAN", which is available in flat sheet stock. An advantage of this material is its hardness and appearance of natural stone, as it is filled with a high percentage of indigenous elements. Scratches and stains may be removed by application of abrasive materials and its durability has made this substance very popular with homeowners and commercial establishments. The problem still exists in cutting a hole within the material for a sink. Basically, this material is very hard and strong. However, in narrow cross-sections, it is brittle because of the structural density and strength to weight ratio. The manufacturer advises either extreme care in handling and transporting countertops with cut-outs, or actually making the cut-out on site.

In either event, difficulty is encountered, therefore, a primary object of the invention is to provide a flush mounted countertop sink without any seams in the surface and without the necessity of cutting the base material at all. This object is realized by using a Densified Solid Surface polymer and pouring the countertop from a liquid mixture onto a previously formed sink of the same material. As the material, in the liquidous state, hardens, the sink, having a flange underneath, becomes an integral part of the countertop and, as such, complete bonding occurs with no seam or joint at all. This procedure not only eliminates cutting holes, but provides a robust and rigid countertop that is easily transported to the site.

It will be noted that with this process, the top surface is completely smooth and flat, making it easy to wipe and completely eliminates joints that may eventually become a health hazard, if in time, adhesive used in the joint deteriorates and a crack occurs. When a crack of any size is present, even microscopically small, it could collect organic nutrient matter that may putrefy and become a perfect media for the growth of microorganisms including bacteria, fungus, and yeasts.

An important object of the invention is the tremendous support strength of the joint itself. Inasmuch as the structural strength of the sink bowl material is duplicated in the countertop material, when the countertop is actually poured over an outwardly extending peripheral flange of the sink. The interface between elements becomes as strong and durable as the base material itself, just as if there were no joint or seam at all. Further, since the structure now actually follows the configuration of the recessed sink, the overall strength is not comprised, instead, it may actually be reinforced due to the angular displacement of the sink configuration. When this object is viewed in contrast with the weakness of a cut-out, its advantage may be clearly visualized.

Another object of the invention becomes extremely important relative to economics. While the use of CORIAN is popular and highly thought of in the public eye, its greatest drawback is that it is extremely expensive. This material is generally sold in sheet form and custom made into the final configuration by skilled labor cutting holes for the sink and adding splashboards along with front edges. Many times this technique requires routing and longitudinal cuts in the base material. It is clearly apparent that the precision required precludes the use of common laborers and, at the present time, high skilled labor costs place this desirable product beyond the reach of many. The invention has solved this economic problem in that the sink is fabricated by experienced laborers in a shop under ideal conditions where production time is a fraction of the hand labor required by prior art.

Still another object of the invention is the use of Densified Solid Surface which, like CORIAN, is formulated of resin, catalyst, and a filler of minerals, creating the appearance of natural stone. This material is scratch and stain resistant and impervious to water. The greatest advantage is that it may be easily formulated and cast in a custom shop using the improved process of the invention. Again, no expensive tooling is required over and above that found in most custom manufacturers facilities. Further, with this process, a countertop is produced that is flat and permits the integral sink to be positioned conveniently at any location on the top. A bull nose front edge of extruded plastic, or metal, may easily and inexpensively added to the front edge and a splash or backboard may be added using the same basic construction techniques.

Yet another object of the invention has to do with building codes within some areas of the United States. Certain localities require the sink design to be approved by the IAPMO, which tests and accredits sink configurations and materials. Each sink style must be approved separately, therefore, if the sink has an integral countertop, each embodiment must have separate approval and because this endorsement is expensive and time consuming, the procedure becomes costly, unwieldy, and makes the product non-competitive. The invention circumvents this problem by having only each different sink bowl configuration by itself approved and then using this pre-approved design in any embodiment of countertop combination, as only the bowl design is controlled by this agency, therefore, a one time approval is all that is necessary.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment illustrating a double bowl kitchen sink within the countertop.

FIG. 2 is a cross-sectional view taken along lines 2—2 of FIG. 1.

FIG. 3 is a partial isometric view of the preferred embodiment illustrating a lavatory sink within the countertop.

FIG. 4 is a cross-sectional view taken along lines 4—4 of FIG. 3.

FIG. 5 is a cross-sectional view taken along lines 5—5 of FIG. 1 depicted in full scale.

FIG. 6 is a partial isometric view of the smooth flat mold having a raised peripheral rim with a double bowl kitchen sink captivated on the surface with uncured filled polymer poured thereupon from a container, thereby partially covering the surface.

FIG. 7 is a center line cross-sectional view of the countertop enclosing a lavatory sink outwardly extending top flange.

FIG. 8 is a center line cross-sectional view of the countertop enclosing a lavatory sink top flange that extends outwardly to form a decorative outline, such as that depicted in FIG. 11.

FIG. 9 is a center line cross-sectional view of the countertop enclosing a lavatory sink having an inwardly tapered top flange with a pointed joining edge.

FIG. 10 is a center line cross-sectional view of the countertop enclosing a lavatory sink having a top flange with a recessed dovetail.

FIG. 11 is a top view of the preferred embodiment with the top flange of the sink extended outwardly to form a decorative outline in the form of a heart.

BEST MODE FOR CARRYING OUT THE INVENTION

The best mode for carrying out the invention is presented in terms of a preferred, second, and a third embodiment.

All three embodiments are primarily designed alike, except the second embodiment adds a gelcoat to the mold and sink, and the third embodiment is for a below surface sink mount.

It should be noted, at this point, that in order to differentiate the sink from the countertop, the sink portion is designated as simply the sink, sink bowl, or sink basin, while the countertop or drainboard is described as the countertop, even though the proper designation for the combination is a countertop sink. This representation will hopefully make the meaning clear in the description of the two elements.

Figure 12:
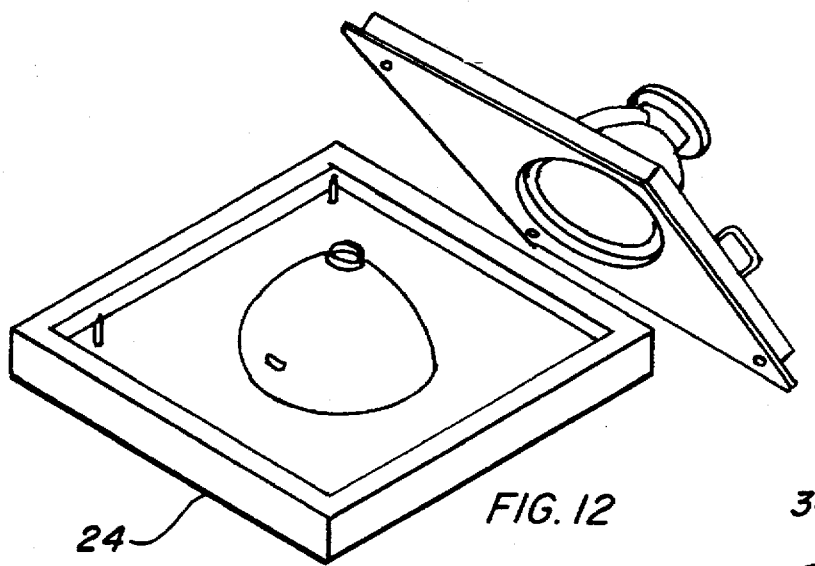
FIG. 12 is a partial isometric view of the mold for a sink bowl having a top flange.

The preferred embodiment, as shown in FIGS. 1 through 14 and 21, is the process of fabricating a seamless flush mounted sink. The steps of this process consist of constructing a sink bowl 22 of polymer in a sink mold 24, as depicted in FIG. 12. The sink mold 24 may be of any construction well known in the art, however, the sink 22 is specially constructed with an outwardly extending peripheral top flange 26. The sink 22 also includes the usual concave bowl and opening for a drain. It should be noted that most common sink configurations are included in this process, such as shallow bathroom or lavatory basins, kitchen sinks in their single or double bowl configurations, along with food waste disposal bowls, wash sinks, utility sinks, lab sinks, service sinks, process sinks, etc. The only difference in form and shape is that it must include a peripheral top flange 26. Various sink configurations are illustrated in FIGS. 1 through 4 and 6 through 11. The purpose of the top flange 26 is to provide an attaching surface and sufficient structural integrity to make a seamless joint.

While the actual dimensional size of the top flange 26 may vary with the application, a thickness of from 0.25 inches (0.64 cm) to 0.38 inches (0.97 cm) and, an outward extension of from 0.38 inches (0.97 cm) to 1.50 inches (3.81 cm) is preferred. This physical size has proven to be optional in actual usage, however, other embodiments of the top flange 26 function acceptably. FIGS. 8 and 11 illustrate such a flange shape as it extends outwardly to form a decorative design outline 28. While a heart shape is depicted, any form may be used with equal ease, such as the shape of an animal, cartoon character, flower, person, or any object or symbol.

Figure 21:
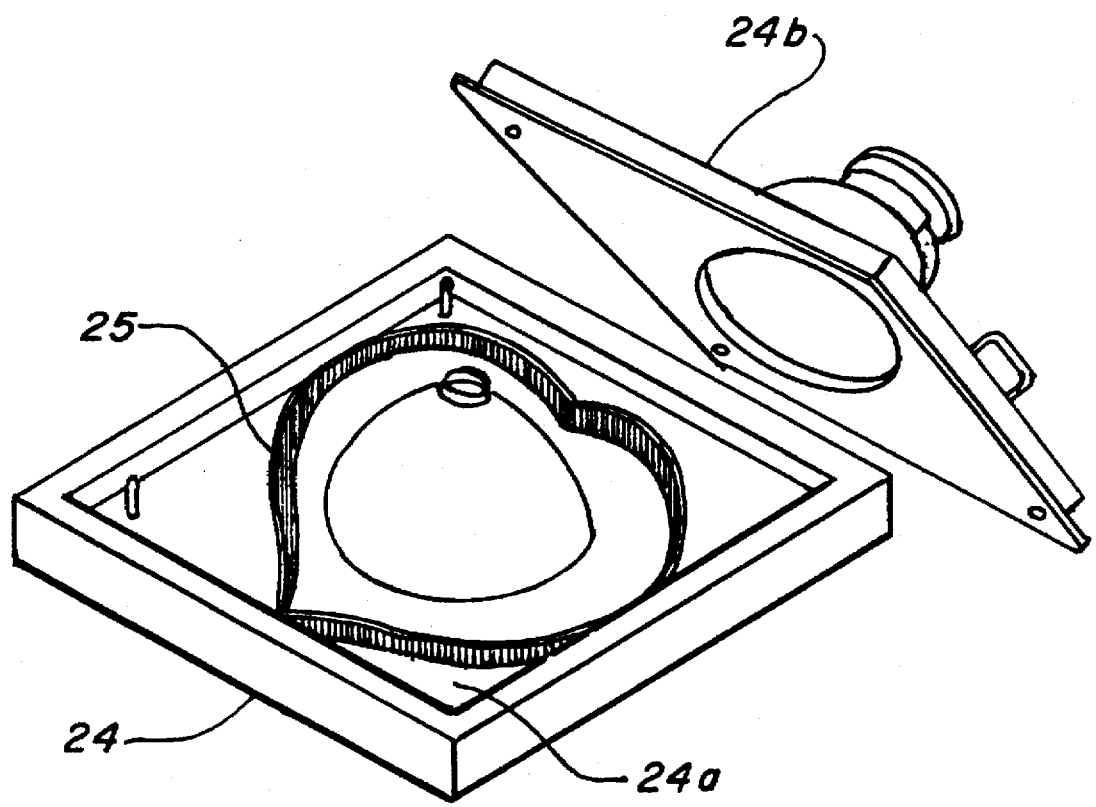
FIG. 21 is a partial isometric view of the mold for constructing a sink having a decorative design outwardly extending flange.

In order to construct this type of decorative design outline, a distinctive mold must be used, as many different types of outlines may be required. FIG. 21 illustrates such a mold which includes a flat mold bottom 24a and a concave mold top 24b. This type of construction is similar to the molds well known in the art, such as shown in FIG. 12, except no flange is formed by either one. The decorative design outline 28 of the peripheral top flange 26 is formed by adding a circumventing band hoop 25 in between the mold top 24b and bottom 24a. This provision makes it possible to produce all types of shapes inexpensively, as only the band hoop 25 requires changing and the balance of the mold 24a and 24b remain unaltered. The band hoop 24 may be made of any material, such as rectangular mild steel bar, wood, pressed board, thermoplastic, fiberglass, or a myriad of other similar materials, either bent or cut to the desired configuration.

Another embodiment of this top flange 26 is illustrated in FIG. 9 and, instead of having the flange upper and lower surfaces parallel, the top of the flange is tapered inwardly to a sharp apex forming a pointed joining edge 30 that ultimately is flush with a top surface.

FIG. 10 depicts still another embodiment of this flange 26 wherein a dovetail shaped recess 32 is included within the flange perimeter. This dovetail shaped recess 32 provides a positive and structurally strong gripping surface for joining.

Figure 13:
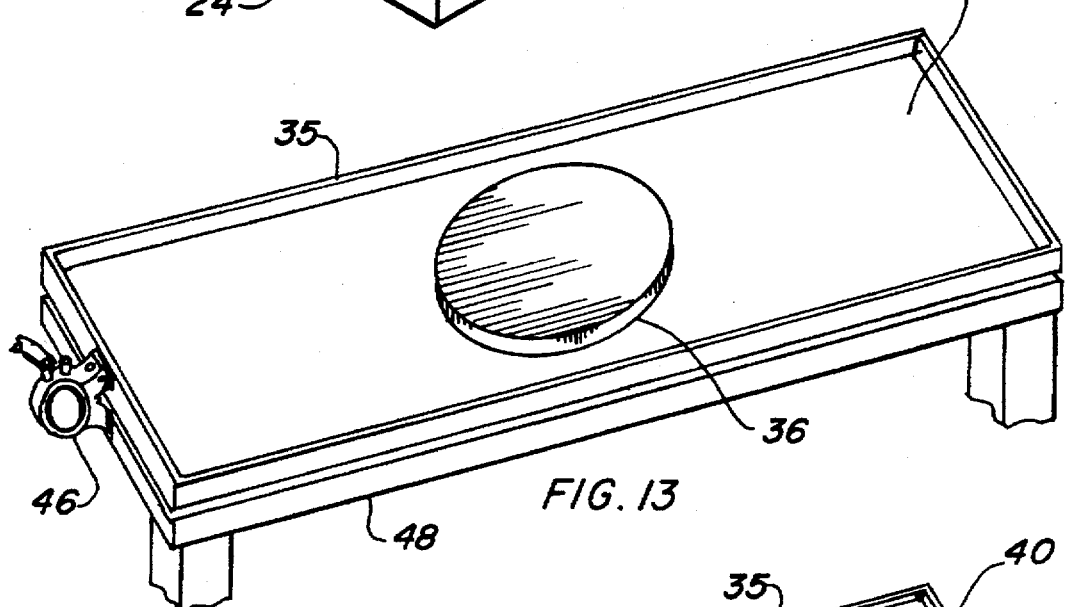
FIG. 13 is a partial isometric view of the smooth flat mold with a plug attached to the surface.

The process is then to captivate the sink bowl 22 in an inverted attitude on a smooth, flat mold 34, having a raised perimeter rim 35. The sink's top flange 26 contiguously engages the mold's flat surface and captivation of the sink is provided by the use of a plug 36, as shown in FIGS. 7 through 10 and 18, which has the same external shape as the internal surface of the sink bowl 22. This plug 36 is attached to the smooth surface of the flat mold 34 with adhesive, preferably double-sided pressure sensitive tape 38. While a solid plug 36 is depicted in the drawings, any type will work equally well, such as hollow, truncated, or even a flat ring, as shown in FIG. 13, provided movement of the sink 22 is impeded in any horizontal direction.

When the sink 22 is placed over the plug 36, a seal is made between the top flange 26 and the mold's flat surface. The weight of the sink bowl 22 is usually enough to maintain integrity of this seal, however, additional weights may be added, or a clamp attached, to create pressure therebetween.

Figure 14:
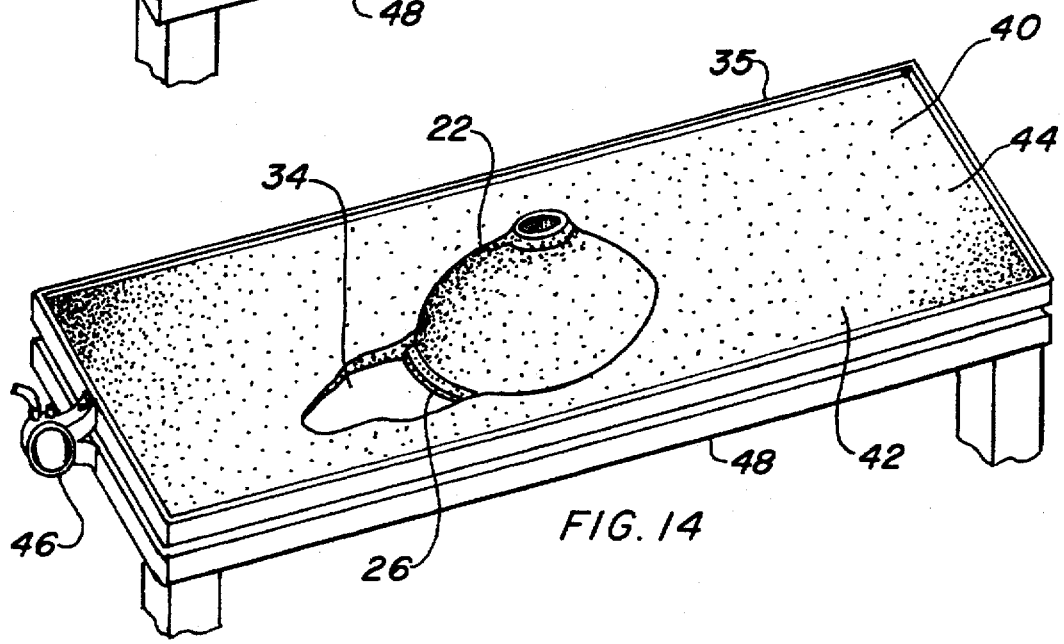
FIG. 14 is a partial isometric view of the mold with the sink in place and the polymer poured to a finished level. The polymer is partially cut-away to show the flange of the sink bowl.
Figure 15:
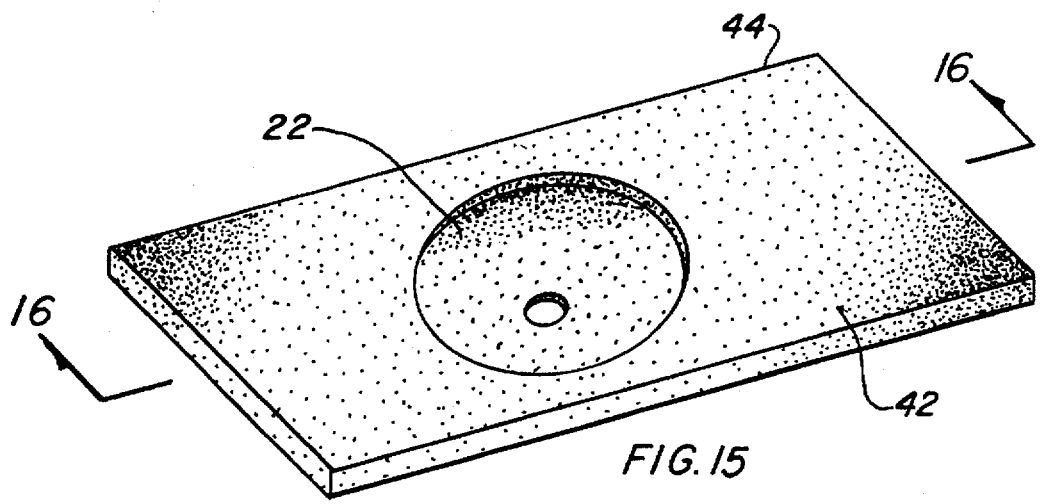
FIG. 15 is a partial isometric view of the third embodiment illustrating a lavatory sink in the countertop.
Figure 16:
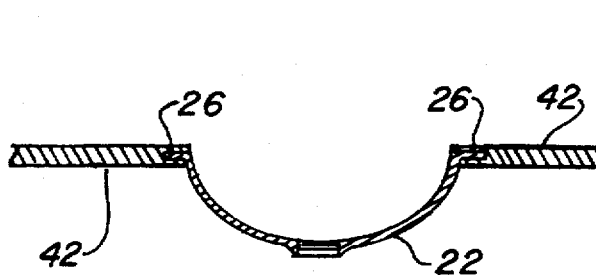
FIG. 16 is a cross-sectional view taken along lines 16—16 of FIG. 15.

With the sink 22 captivated on the flat mold 34, as shown in FIG. 6 and 14, the next step is to pour uncured filled polymer 40 on the smooth flat surface of the flat mold 34 within the rim 35, as depicted in FIG. 6. The level of the polymer 40 is above the sink peripheral top flange 26 from 25 percent to 50 percent of it's total level, as shown right side up in FIG. 5. The filled polymer 40 becomes an integral countertop 42 of the countertop sink 44. The formulation of the filled polymer 40 is preferably as follows:

Resin, 38 percent by weight, and

Aluminum trihydroxide filler, 59 percent by weight

Catalyst, 2 percent by weight, and

Wetting agent, 1 percent by weight

It will be noted that slight variations in the proportional ratio will still produce the same end results and be an acceptable substitute.

The next step after pouring is to vibrate the flat mold 34 to settle the uncured polymer. This vibration is accomplished by the use of a mechanical vibrator 46, preferably of the pneumatic ball type, as depicted in FIGS. 6, 13 and 14. This preferred vibrator 46 has a steel ball that is pneumatically driven around a stationary race creating equal vibrational amplitude in all directions. The vibrator 46 is attached to the flat mold 34 and a base 48 which includes isolation material in between. This vibrator 46 creates a frequency of from 10,000 vibrations per minute to 25,000 vibrations per minute and the process continues for a time duration of from 1 minute to 10 minutes, at which time the polymer 40 is completely settled.

The polymer 40 cures by homopolymerizing with the catalyst for from 35 minutes to 40 minutes, at which time it has hardened sufficiently to be removed from the flat mold 34.

Post curing for a time duration of from 3 hours to 5 hours in the next step in the process. This post curing may be accomplished by exposure to the sun if the ambient temperatures are above 50 degrees F (10 degrees C), or simply air curing if the prevailing ambient temperatures permit. If rapid curing is required, the countertop sink 44 may be placed in an oven and baked at a temperature of from 160 degrees F (71 degrees C) to 180 degrees F (82 degrees C) for a period of two hours.

The final step in the preferred process embodiment is to smooth the countertop 42 working surface with grit impregnated abrasive media. The purpose of this procedure is to remove any film of polymer that may have seeped between the top flange 26 of the sink bowl 22 and the flat mold 34, particularly if no additional weight or compression was added to the sink at the time of pouring. This abrasive media consists of backing sheets of paper, cloth, or fiber, containing an attached abrasive having a grain grit number rating of from 220 grit to 1200 grit. The smoothing procedure may begin and end at any grit number depending on the surface roughness leaving the mold and the desired texture and smoothness of the finish.

It may be seen that this process produces a countertop sink 44 with the sink bowl 22 flush with the top surface of the countertop 42 and no seam in between. In many cases, the seam is almost imperceptible using the same material compositions and color matches, or the union may be bold and contrasting, where different hues and filler materials are employed.

The second embodiment is also illustrated in the same FIGS. 1 through 14, however, the difference is in the overall finish and glossiness of the surface. This is accomplished by the addition of a step between captivating the sink bowl 22 on the flat mold 34 and pouring the uncured filled polymer 40 onto the flat mold 34.

This step is accomplished by spraying a transparent gelcoat to the exposed outside surfaces of the sink bowl 22, including the outwardly extending peripheral top flange 26, and the flat surface and inside edges of the raised peripheral rim 35 of the smooth flat mold 34. The gelcoat is clear and has a viscosity that lends itself to fill the interface between the flat mold 34 and the extended edge of the top flange 26, without creeping underneath. The gelcoat material in its varieties are all well known in the art and commercially available. This addition provides a smooth and lucid surface that is continued throughout the entire countertop sink 44, including the sink bowl 22 that ordinarily receives this coating in its original fabrication. The step of smoothing the countertop working surface with grit impregnated abrasive media may obviously be omitted, or at least kept to an absolute minimum, as the countertop sink 44 is basically finished when removed from the flat mold 34. All of the steps of the preferred embodiment are required for the second embodiment, with the exception of this final smoothing step, which may be a simple touch-up with very fine abrasive material, in most cases.

The third embodiment is illustrated in FIGS. 15 through 20 and is basically the same in its process steps, as the preferred embodiment, except the step of captivating the sink bowl in an inverted attitude on a smooth flat mold is expanded to include attaching a plug 36 to the flat mold 34 and then captivating the sink bowl 22 on the plug 36 in an inverted attitude. Further, the peripheral top flange 26 is spaced from 0.19 inch (0.48 cm) to 0.31 inch (0.79 cm) above the flat mold. Also, the step of pouring unfilled polymer changes from 25 to 30 percent of its total level to 15 percent to 30 percent of its total level. Alternatively, in this embodiment, the countertop working surface may be smoothed as indicated in the preferred embodiment, or an application of gelcoat may be added as outlined in the second embodiment.

Figure 17:
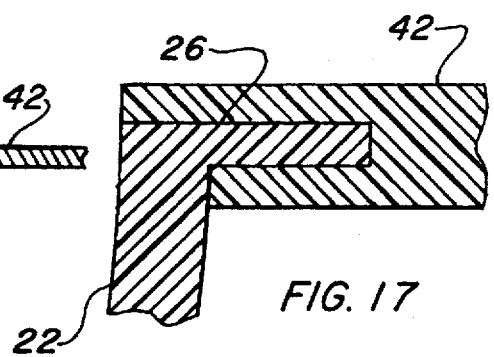
FIG. 17 is a cross-sectional view taken along lines 17—17 of FIG. 15 shown in full scale.

The resultant differences are centered around the top flange 26 of the sink bowl 22 and its spaced relationship with the flat mold 34. The top flange 26 is actually moved upward on the plug 36 from 0.19 inch (0.48 cm) to 0.31 inch (0.79 cm) and the filled polymer 40 occupies this void. This arrangement then sandwiches the top flange 26 in between, as shown in FIG. 17. The top level of polymer 40 then covers this top flange 26 some 15 to 30 percent of its total level. This embodiment is still considered a flush mounted countertop, as no flange or attachment means are underneath, as in a conventional undermounted sink; and the sink is still an integral part of the countertop 42.

Figure 18:
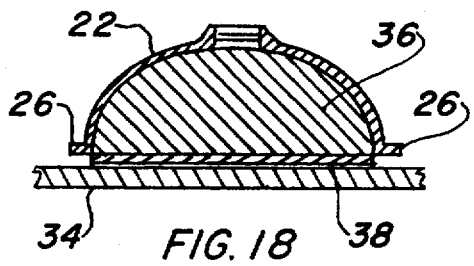
FIG. 18 is a view of the centerline cross-sectional view of a sink mounted on a plug.
Figure 19:
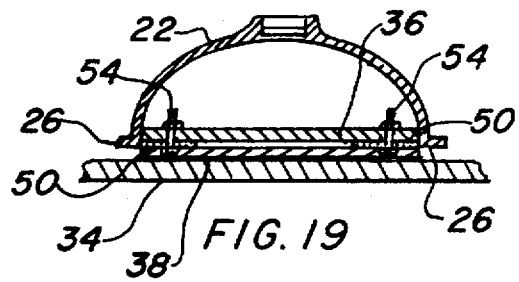
FIG. 19 is a view of the centerline cross-sectional view of a sink mounted on a plug having a compressible gasket.
Figure 20:
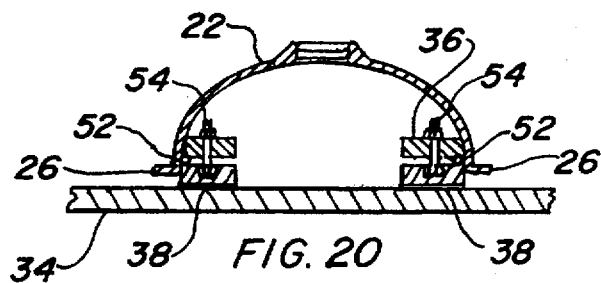
FIG. 20 is a view of the centerline cross-sectional view of a sink mounted on a plug having a compressible O-ring.

In order to create a space between the top flange 26 and the flat mold 34, the plug 36 must be sized to have a tight slip fit or press fit in order to hold the sink bowl 22 in place. This fit is accomplished by either forming the plug 36 from the same sink mold 24 and adding a spacer to create the gap, as shown in FIG. 18, or split the plug 36 in half and add a compressible resilient member, as shown in FIGS. 19 and 20. A compressible gasket 50 may be added between halves of the plug 36, as depicted in FIG. 19, or an O-ring 52, illustrated in FIGS. 20. In either case, the halves may be tightened together with threaded fasteners 54, as shown, expanding the resilient gasket 50, or O-ring 52, into intimate and liquid-tight communication. An O-ring 52 of square cord stock spliced together at the ends is preferred, however, a round cross-section O-ring will also function adequately.

This embodiment will lend itself to be sanded smooth on the countertop 42, as in the preferred embodiment, or provided with a glossy surface, as delineated in the second embodiment.

While the invention has been described in complete detail and pictorially shown in the accompanying drawings, it is not to be limited to such details since many changes and modifications may be made in the invention without departing from the spirit and scope thereof. Hence, it is described to cover any and all modifications and forms which may come within the language and scope of the appended claims.

What is claimed is:

1. A process for fabricating a seamless flush mounted countertop sink which comprises the steps of:
 a) constructing a sink bowl having an outwardly extending peripheral top flange, a concave bowl, and an opening for a drain,
 b) captivating said sink bowl in an inverted attitude on a smooth flat mold having a raised perimeter rim,
 c) pouring uncured filled polymer on said flat mold and sink bowl to a level above the sink peripheral flange of from 25 percent to 50 percent of its total level to form an integral countertop sink,
 d) vibrating said flat mold to settle the polymer,
 e) curing the polymer for a time duration of from 35 minutes to 40 minutes.
 f) removing the countertop sink from the flat mold and post curing for a time duration of from 3 hours to 5 hours, and
 g) smoothing the countertop working surface with grit impregnated abrasive media.

2. The process for fabricating a seamless flush mounted countertop sink, as recited in claim 1, wherein said sink peripheral flange has a thickness of from 0.25 inch (0.64 cm) to 0.38 inch (0.97 cm).

3. The process for fabricating a seamless flush mounted countertop sink, as recited in claim 1, wherein said sink peripheral top flange extends outwardly from 0.38 inch (0.97 cm) to 1.50 inch (3.81 cm).

4. The process for fabricating a seamless flush mounted countertop sink, as recited in claim 1, wherein said sink peripheral top flange extends outwardly to form a decorative design outline.

5. The process for fabricating a seamless flush mounted countertop sink, as recited in claim 4, wherein said sink's peripheral top flange extending outwardly to form a decorative design outline is constructed in a mold comprising a flat mold bottom, a concave mold top, and a removable circumventing band hoop in a shape of the decorative design, juxtapositioned therebetween.

6. The process for fabricating a seamless flush mounted countertop sink, as recited in claim 1, wherein said sink peripheral top flange is angularly tapered inwardly to a sharp apex forming a pointed joining edge flush with the countertop.

7. The process for fabricating a seamless flush mounted countertop sink, as recited in claim 1, wherein said sink peripheral top flange includes a recessed dovetail.

8. The process for fabricating a seamless flush mounted countertop sink, as recited in claim 1, wherein said filled polymer further comprises:
 a) Resin, 38 percent by weight,
 b) Aluminum trihydroxide filler, 59 percent by weight,
 c) Catalyst, 2 percent by weight, and
 d) Wetting agent, 1 percent by weight.

9. The process for fabricating a seamless flush mounted countertop sink as recited in claim 1 wherein said vibrating said flat mold further comprises a frequency of from 10,000 vibrations per minute to 25,000 vibrations per minute for a duration of from 1 minute to 10 minutes.

10. The process for fabricating a seamless flush mounted countertop sink as recited in claim 1 wherein said grit impregnated abrasive media further comprises a backing sheet having attached abrasive with a grain grit number rating of form 220 grit to 1200 grit.

11. A process for fabricating a seamless flush mounted countertop sink which comprises the steps of:
 a) constructing a sink bowl having an outwardly extending peripheral top flange, a concave bowl and an opening for a drain,
 b) captivating said sink bowl in an inverted attitude on a smooth flat mold having a raised perimeter rim,
 c) applying a transparent gelcoat to exposed sink bowl surfaces and flat mold including inner raised perimeter rim, d) pouring uncured filled polymer on said coated flat mold and coated sink bowl to a level above the sink peripheral flange of from 25 percent to 50 percent of its total level to form an integral countertop sink, e) vibrating said flat mold to settle the polymer, f) curing the polymer for a time duration of from 35 minutes to 40 minutes, and g) removing the countertop sink from the flat mold and post curing for a time duration of from 3 hours to 5 hours.

12. The process for fabricating a seamless flush mounted countertop sink, as recited in claim 11, wherein said sink peripheral flange has a thickness of from 0.25 inch (0.64 cm) to 0.38 inch (0.97 cm).

13. The process for fabricating a seamless flush mounted countertop sink, as recited in claim 11, wherein said sink peripheral top flange extends outwardly from 0.38 inch (0.97 cm) to 1.50 inch (3.81 cm).

14. The process for fabricating a seamless flush mounted countertop sink, as recited in claim 11, wherein said sink peripheral top flange extends outwardly to form a decorative design outline.

15. The process for fabricating a seamless flush mounted countertop sink, as recited in claim 14, wherein said sink peripheral top flange extending outwardly to form a decorative design outline is constructed in a mold comprising a flat mold bottom, a concave mold top, and a removable circumventing band hoop in a shape of the decorative design, juxtapositioned therebetween.

16. The process for fabricating a seamless flush mounted countertop sink, as recited in claim 11, wherein said sink peripheral top flange is angularly tapered inwardly to a sharp apex forming a pointed joining edge flush with the countertop.

17. The process for fabricating a seamless flush mounted countertop sink, as recited in claim 11, wherein said sink peripheral top flange includes a recessed dovetail.

18. The process for fabricating a seamless flush mounted countertop sink, as recited in claim 11, wherein said filled polymer further comprises:

a) Resin, 38 percent by weight, b) Aluminum trihydroxide filler, 59 percent by weight, c) Catalyst, 2 percent by weight, and d) Wetting agent, 1 percent by weight.

19. The process for fabricating a seamless flush mounted countertop sink, as recited in claim 11, wherein said vibrating said flat mold further comprises a frequency of from 10,000 vibrations per minute to 25,000 vibrations per minute for a duration of from 1 minute to 10 minutes.

20. A process for fabricating a seamless flush mounted countertop sink which comprises the steps of:

a) constructing a sink bowl having an outwardly extending peripheral top flange, a concave bowl, and an opening for a drain, b) attaching a plug to a smooth flat mold having a raised perimeter rim, c) captivating said sink bowl in an inverted attitude on the plug with the peripheral top flange spaced from 0.19 inch (0.48 cm) to 0.31 inch (0.79 cm) above the flat mold, d) pouring uncured filled polymer on said flat mold and sink bowl to a level above the sink peripheral flange of from 15 percent to 30 percent of its total level, to form an integral countertop sink, e) vibrating said flat mold to settle the polymer, f) curing the polymer for a time duration of from 35 minutes to 40 minutes, and g) removing the countertop sink from the flat mold and post curing for a time duration of from 3 hours to 5 hours.

21. The process for fabricating a seamless flush mounted countertop sink, as recited in claim 19, further comprising smoothing the countertop working surface with grit impregnated media having a grain grit number rating of from 220 grit to 1200 grit.

22. The process for fabricating a seamless flush mounted countertop sink, as recited in claim 19, further comprising applying a transparent gelcoat to exposed surfaces of the sink bowl, plug, and flat mold, including inner raised perimeter rim, between step c) and step d).

* * * * *